(12) United States Patent
Keys et al.

(10) Patent No.: US 7,444,777 B2
(45) Date of Patent: Nov. 4, 2008

(54) ERGONOMIC CUSHION FOR A FISHING ROD

(76) Inventors: Clyde J. Keys, 876 Ranch Rd., Tarpon Springs, FL (US) 34688; Gunnar Gause, 1208 E. Court St., Tarpon Springs, FL (US) 34689

( * ) Notice: Subject to any disclaimer, the term of this patent is extended or adjusted under 35 U.S.C. 154(b) by 0 days.

(21) Appl. No.: 11/564,307

(22) Filed: Nov. 29, 2006

(65) Prior Publication Data
US 2008/0120893 A1   May 29, 2008

(51) Int. Cl.
*A01K 87/08* (2006.01)
*A01K 97/10* (2006.01)

(52) U.S. Cl. .............................. 43/23; 43/21.2; 43/25; 16/110.1; 16/422; 16/430

(58) Field of Classification Search ............... 43/21.2, 43/23, 25; 16/110.1, 111.1, 422, 426, 430
See application file for complete search history.

(56) References Cited

U.S. PATENT DOCUMENTS

| | | | | | |
|---|---|---|---|---|---|
| 572,226 | A | * | 12/1896 | Spiegel | 43/23 |
| 858,881 | A | * | 7/1907 | Letterman | 43/25 |
| 2,085,654 | A | * | 6/1937 | Harris | 43/25 |
| 2,144,876 | A | * | 1/1939 | Garnett | 43/21.2 |
| 2,149,837 | A | * | 3/1939 | Browne | 43/23 |
| 2,244,408 | A | * | 6/1941 | Thompson | 43/25 |
| 2,464,880 | A | * | 3/1949 | McCombs | 43/25 |
| 2,526,981 | A | * | 10/1950 | Von Beck | 43/21.2 |
| 2,561,289 | A | * | 7/1951 | Paris | 43/25 |
| 2,601,839 | A | * | 7/1952 | Kucewicz | 43/17 |
| 2,650,448 | A | * | 9/1953 | Lichtig | 43/25 |
| 2,653,406 | A | * | 9/1953 | Grabiak et al. | 43/25 |
| 2,716,184 | A | * | 8/1955 | O'Neil | 362/394 |
| 2,804,711 | A | * | 9/1957 | Kozar | 43/25 |
| 2,826,852 | A | * | 3/1958 | Wardrip | 43/23 |
| 3,029,543 | A | * | 4/1962 | Budd | 43/25 |
| 3,159,939 | A | * | 12/1964 | Transeau | 43/21.2 |
| 3,367,056 | A | * | 2/1968 | Johnson | 43/25 |
| 3,372,509 | A | * | 3/1968 | Arsenault | 43/21.2 |
| 3,372,510 | A | * | 3/1968 | Arsenault | 43/21.2 |
| 3,410,016 | A | * | 11/1968 | Arsenault | 43/21.2 |
| 3,679,530 | A | * | 7/1972 | Perina | 248/682 |

(Continued)

FOREIGN PATENT DOCUMENTS

CA      2176262 A1 * 11/1997

(Continued)

*Primary Examiner*—Darren W Ark
(74) *Attorney, Agent, or Firm*—Ronald E. Smith; Smith & Hopen, P.A.

(57) ABSTRACT

An ergonomic cushion is adapted to be releasably attached to a proximal end of a fishing rod. The cushion has a top and a bottom that are integrally formed with one another. The top is wider than the bottom so that the cushion fits under an arm without cutting off circulation. A bore formed in the bottom snugly receives the proximal end. In a second embodiment, the cushion is solid and an elastic band tightly ensleeves the cushion and the proximal end of the rod so that all of the cushion is between the proximal end and the under arm area of the user. The butt end of the rod may be placed into a rod holder without removal of the cushion.

1 Claim, 3 Drawing Sheets

U.S. PATENT DOCUMENTS

| | | | | |
|---|---|---|---|---|
| 3,973,348 | A * | 8/1976 | Shell | 43/23 |
| 3,981,043 | A * | 9/1976 | Curry | 16/430 |
| 4,014,129 | A * | 3/1977 | Capra | 43/23 |
| 4,041,635 | A * | 8/1977 | Savage | 43/25 |
| 4,118,882 | A * | 10/1978 | Gorsky | 43/25 |
| 4,262,385 | A * | 4/1981 | Norman | 16/411 |
| 4,453,332 | A * | 6/1984 | Wightman | 43/23 |
| 4,463,512 | A * | 8/1984 | McCreery | 43/23 |
| 4,559,735 | A * | 12/1985 | Batick, Jr. | 43/21.2 |
| 4,577,432 | A * | 3/1986 | Brackett et al. | 43/23 |
| 4,658,533 | A * | 4/1987 | Mendoza | 43/21.2 |
| 4,693,029 | A * | 9/1987 | Yamamoto et al. | 43/23 |
| 4,697,377 | A * | 10/1987 | Martin | 43/23 |
| 4,747,227 | A * | 5/1988 | Kress | 43/23 |
| 4,870,774 | A * | 10/1989 | Yamato | 43/23 |
| 4,875,304 | A * | 10/1989 | Hansen | 43/25 |
| 4,944,111 | A * | 7/1990 | Daniel | 43/25.2 |
| 4,958,758 | A * | 9/1990 | Tipple et al. | 224/267 |
| 4,961,572 | A * | 10/1990 | Badillo et al. | 473/538 |
| 5,012,607 | A * | 5/1991 | Meschkat | 43/25 |
| 5,016,148 | A * | 5/1991 | Kohm | 16/426 |
| 5,121,804 | A * | 6/1992 | Labs et al. | 43/25 |
| 5,127,182 | A * | 7/1992 | Hutchings et al. | 43/25 |
| 5,156,562 | A * | 10/1992 | Pearson et al. | 43/25 |
| 5,159,775 | A * | 11/1992 | Sutula, Jr. | 43/21.2 |
| 5,237,769 | A * | 8/1993 | Navarro | 43/21.2 |
| 5,313,735 | A * | 5/1994 | Latouche | 43/25 |
| 5,355,611 | A * | 10/1994 | Dahlberg et al. | 43/21.2 |
| 5,446,989 | A * | 9/1995 | Stange et al. | 43/21.2 |
| 5,460,306 | A * | 10/1995 | Rudd | 43/21.2 |
| 5,503,579 | A * | 4/1996 | Curran et al. | 43/25 |
| 5,551,184 | A * | 9/1996 | Grosse | 43/25 |
| 5,561,937 | A * | 10/1996 | Johnson | 43/21.2 |
| 5,564,217 | A * | 10/1996 | Riedell | 43/23 |
| 5,581,931 | A * | 12/1996 | Swisher | 43/21.2 |
| 5,592,773 | A * | 1/1997 | Perry | 43/25 |
| 5,655,328 | A * | 8/1997 | Childs et al. | 43/25 |
| 5,842,301 | A * | 12/1998 | Cassem | 43/25 |
| 5,862,622 | A * | 1/1999 | Sandman | 43/25 |
| 5,867,868 | A * | 2/1999 | Ward | 16/422 |
| 5,898,975 | A * | 5/1999 | Hancock | 16/426 |
| 5,910,004 | A * | 6/1999 | Antosh | 43/21.2 |
| 5,926,912 | A * | 7/1999 | Claphan | 16/110.1 |
| 5,941,012 | A * | 8/1999 | Dominguez | 43/21.2 |
| 5,962,817 | A * | 10/1999 | Rodriguez | 43/25 |
| 6,029,389 | A * | 2/2000 | Newton et al. | 43/23 |
| 6,065,240 | A * | 5/2000 | Paddock | 43/21.2 |
| 6,098,333 | A * | 8/2000 | Wickizer et al. | 43/23 |
| 6,105,302 | A * | 8/2000 | Yamamoto et al. | 43/23 |
| 6,237,274 | B1 * | 5/2001 | Head et al. | 43/25 |
| 6,295,755 | B1 * | 10/2001 | Macaluso | 43/25 |
| 6,314,617 | B1 * | 11/2001 | Hastings | 43/23 |
| 6,347,477 | B1 * | 2/2002 | Hopper | 43/21.2 |
| 6,360,402 | B1 * | 3/2002 | Crabtree | 16/422 |
| 6,360,475 | B1 * | 3/2002 | Lepage et al. | 43/23 |
| 6,427,678 | B1 * | 8/2002 | Trzeciak | 43/25 |
| 6,493,982 | B1 * | 12/2002 | Macaluso | 43/25 |
| 6,553,710 | B1 * | 4/2003 | Grozik | 43/23 |
| 6,629,382 | B2 * | 10/2003 | Irrgang et al. | 43/23 |
| 6,694,666 | B2 * | 2/2004 | Iwabuchi | 43/25 |
| 6,705,041 | B2 * | 3/2004 | Hays | 43/25 |
| 6,748,691 | B2 * | 6/2004 | Doucette | 43/25 |
| 6,752,556 | B2 * | 6/2004 | Pearce | 16/430 |
| 6,802,150 | B2 * | 10/2004 | Harden | 43/21.2 |
| 6,973,750 | B1 * | 12/2005 | Kim | 43/23 |
| 2002/0043015 | A1* | 4/2002 | Hays | 43/25 |
| 2002/0073601 | A1* | 6/2002 | DeSorcy | 43/25 |
| 2002/0121042 | A1* | 9/2002 | Macaluso | 43/21.2 |
| 2003/0089022 | A1* | 5/2003 | Costephens | 43/25 |
| 2003/0167673 | A1* | 9/2003 | Doucette | 43/25 |
| 2004/0049967 | A1* | 3/2004 | DeSorcy | 43/25 |
| 2006/0201049 | A1* | 9/2006 | Nyland | 43/21.2 |
| 2007/0214708 | A1* | 9/2007 | Millen et al. | 43/23 |

FOREIGN PATENT DOCUMENTS

| | | | | |
|---|---|---|---|---|
| FR | 2462864 | A | * | 3/1981 |
| FR | 2887403 | A1 | * | 12/2006 |
| GB | 2292659 | A | * | 3/1996 |
| GB | 2380223 | A | * | 4/2003 |
| GB | 2416975 | A | * | 2/2006 |
| JP | 05007445 | A | * | 1/1993 |
| JP | 05244849 | A | * | 9/1993 |
| JP | 09299008 | A | * | 11/1997 |
| JP | 10004828 | A | * | 1/1998 |
| JP | 10210913 | A | * | 8/1998 |
| JP | 11289928 | A | * | 10/1999 |
| JP | 2000060371 | A | * | 2/2000 |
| JP | 2000125708 | A | * | 5/2000 |
| JP | 2000139281 | A | * | 5/2000 |
| JP | 2000201591 | A | * | 7/2000 |
| JP | 2001292675 | A | * | 10/2001 |
| JP | 2002360132 | A | * | 12/2002 |
| JP | 2003274811 | A | * | 9/2003 |
| JP | 2003274815 | A | * | 9/2003 |
| JP | 2005073565 | A | * | 3/2005 |
| JP | 2007202528 | A | * | 8/2007 |
| WO | WO 91/09518 | A1 | * | 7/1991 |
| WO | WO 3101825 | A1 | * | 12/2003 |
| WO | WO 2006/014042 | A1 | * | 2/2006 |

* cited by examiner

ERGONOMIC CUSHION FOR A FISHING ROD

BACKGROUND OF THE INVENTION

1. Field of the Invention

This invention relates to improvements in fishing rods. More particularly, it relates to a cushion that is secured to the proximal end of a fishing rod to absorb impacts generated by certain types of fishing activities.

2. Description of the Prior Art

Grouper and other very large fish are commonly found near the bottom of the body of water within which they live. Thus, fishing for such fish is commonly referred to as bottom fishing. Due to the weight and strength of such large fish, the fisherman usually tucks the proximal end of the fishing pole under his or her arm in order to prevent the distal end of the rod from being pulled downwardly by the fish. However, due to the repeated efforts of the fish, the fisherman's underarm area or armpit receives a beating which may lead to bruises, soreness, and the like.

One inventor addressed this problem by mounting a cylindrical cushion at the proximal end of the fishing rod. The fisherman places the cylindrical cushion under the arm and said cushion absorbs much of the force as the fish pulls downwardly on the line at the distal end of the rod.

Although this earlier device performs its intended function, it has the drawback that is does not fit well under the arm of the fisherman. The cylindrical shape does not conform to the shape of the armpit and as a result the cushion itself can become a part of the problem.

Moreover, the cushion has a central bore formed in it that receives the proximal end of the fishing rod. Thus, half of the cushion provides no cushioning effect because it is not positioned between the armpit and the rod.

The earlier devices in this field also interfere with the placement of the rod butt into a rod holder, i.e., they must be removed from the rod before the rod holder can be used. Throughout the course of a day, there are many times when a fisherman desires to place the rod into a rod holder. The prior art cushioning devices must be removed and reinstalled every time the rod holder is used.

What is needed, then, is a more ergonomic cushion that fits comfortably under the arm of a fisherman. There is also a need for an ergonomic cushion that positions substantially all of the cushioning between the user's under arm and the proximal end of the rod so that the cushioning material is not wasted. There is a need as well for a cushioning device that remains on the rod at all times yet does not interfere with placement of the rod into a rod holder.

However, in view of the art considered as a whole at the time the present invention was made, it was not obvious to those of ordinary skill in this art how the identified needs could be met.

SUMMARY OF INVENTION

The long-standing but heretofore unfulfilled need for a fishing rod cushion that overcomes the drawbacks of the earlier fishing rod cushions is now provided in the form of a new, useful, and nonobvious invention.

The novel cushion is ergonomically designed. It is adapted to be releasably attached to a proximal end of a fishing rod. It includes a top and a bottom that are integrally formed with one another. The top has a width greater than a width of the bottom part and the cushion has a height substantially equal to a combined width of the top and bottom. Accordingly, the cushion fits the contour of an armpit so that a fisherman may place the cushion under his arm for extended periods of time with no loss of blood circulation.

In a first embodiment, a throughbore is formed in the bottom part and said throughbore extends the entire length of the cushion. The length of the cushion is not critical and thus is of little importance. It merely needs to be long enough to fit comfortably under the arm of most people.

The throughbore has a diameter slightly less than a diameter of the proximal end, also known as the butt end, of the fishing rod so that the proximal end fits snugly into the throughbore when the cushion is slidingly positioned in ensleeving relation to the proximal end.

The throughbore is positioned in close proximity to a bottom wall of the cushion so that substantially all of the cushioning material is positioned between the proximal end of the rod and the under arm of the user, thereby maximizing the cushioning power of the cushioning material.

The ergonomic shape of the cushion fits the contour of the user's underarm so that the cushion may be comfortably used for long periods of time, with no blockage of blood flow and no numbness.

In a second embodiment, the top and bottom have a solid construction, there being no throughbore formed in the bottom of the cushion. An elastic band having a length substantially equal to a length of the cushion is adapted to tightly ensleeve the cushion.

To attach the cushion to the proximal end of a fishing rod, the elastic band is pulled outwardly away from the cushion and the proximal end of the rod is pushed into an opening created by the outward pulling, said opening being between the elastic band and the cushion. A tight fit is thereby achieved between the elastic band and the proximal end of the fishing rod, thereby tightly securing the cushion to the proximal end. Advantageously, all of the cushioning material is positioned between the proximal end of the fishing rod and the under arm area of the user.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1A:
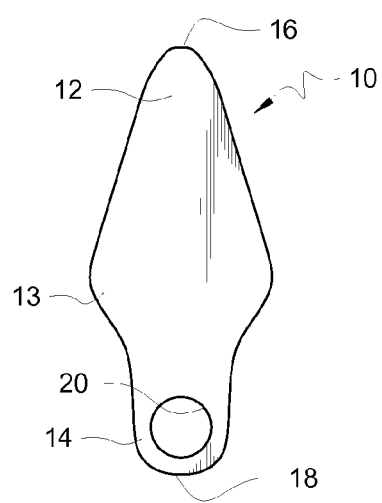
FIG. 1A is an end view of a preferred embodiment of the novel ergonomic cushion.
Figure 1B:
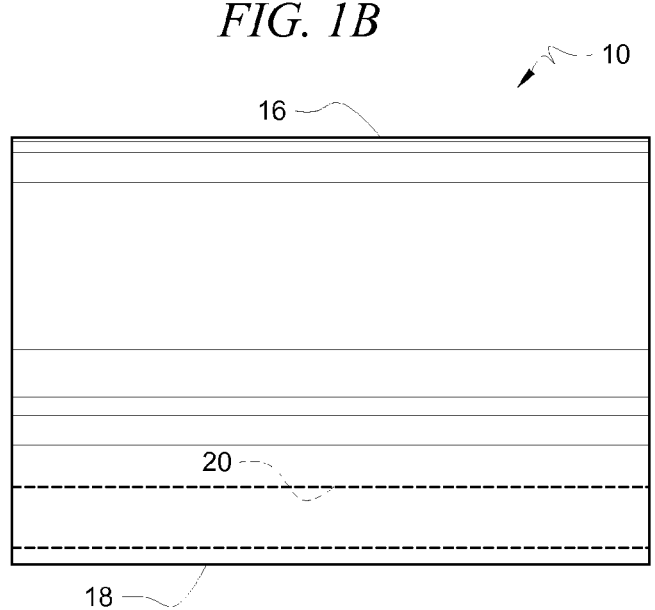
FIG. 1B is a side elevational view thereof.

Referring now to FIGS. 1A and 1B, it will there be seen that the preferred embodiment is denoted as a whole by the reference numeral 10.

Cushion 10 is formed of any suitable foam. The material is preferably buoyant so that it will float if dropped into a body of water. The material must be resilient so that it quickly returns to its original shape when an external force is removed from it.

Cushion 10 has a top 12, a middle 13, and a bottom 14 that are integrally formed with one another. Top wall 16 is rounded as is bottom wall 18. Top 12 has a width less than a width of middle 13 and the width of the middle section is greater than the width of bottom 14. The general shape of cushion 10 is irregular but somewhat oval, being widest at its mid-section as aforesaid and having a length greater than its widest part.

Throughbore 20 is formed in bottom part 14 and extends the entire length of cushion 10 as best understood by comparing FIGS. 1A and 1B. The diameter of throughbore 20 is slightly less than a diameter of a proximal end of a fishing rod, also known as the butt end, so that said proximal end fits snugly into said throughbore when cushion 10 is slidingly positioned onto said proximal end from the distal end.

Significantly, throughbore 20 is positioned in close proximity to bottom wall 18 of cushion 10. In this way, almost all of the cushioning material is positioned between the proximal end of the rod and the under arm of a user, thereby maximizing the cushioning power of the cushioning material.

A shallow cut forming a shallow trough, not depicted, could be made in the perimeter of throughbore 20 to enable radial expansion of the throughbore so that said throughbore may accommodate rods of larger diameters. Some expansion of throughbore 20 will occur even without such a cut.

Figure 2A:
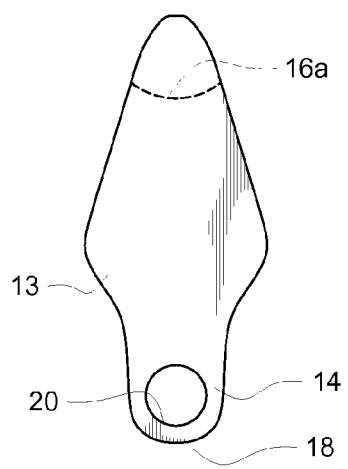
FIG. 2A is an end view of a second embodiment.
Figure 2B:
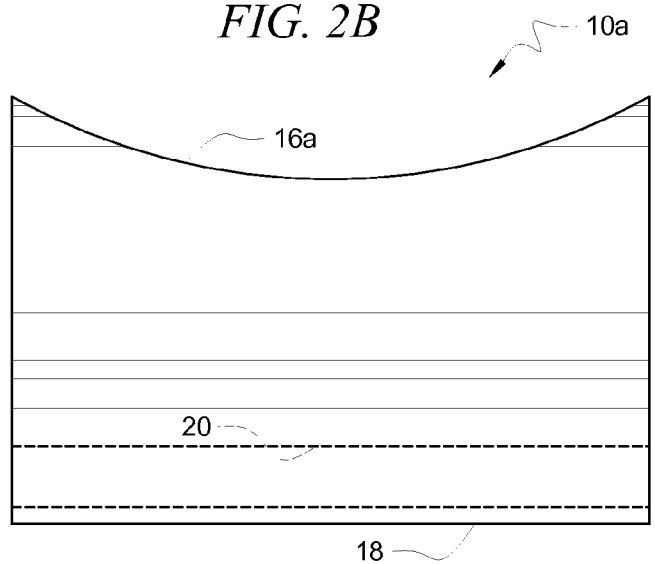
FIG. 2B is a side view of the second embodiment.

A second embodiment 10a is depicted in FIGS. 2A and 2B. This embodiment is the same as the first embodiment with the exception that top wall 16a is saddle-shaped, much like the top end of a crutch, so that it fits perhaps more comfortably under the arm of the user.

Figure 3:
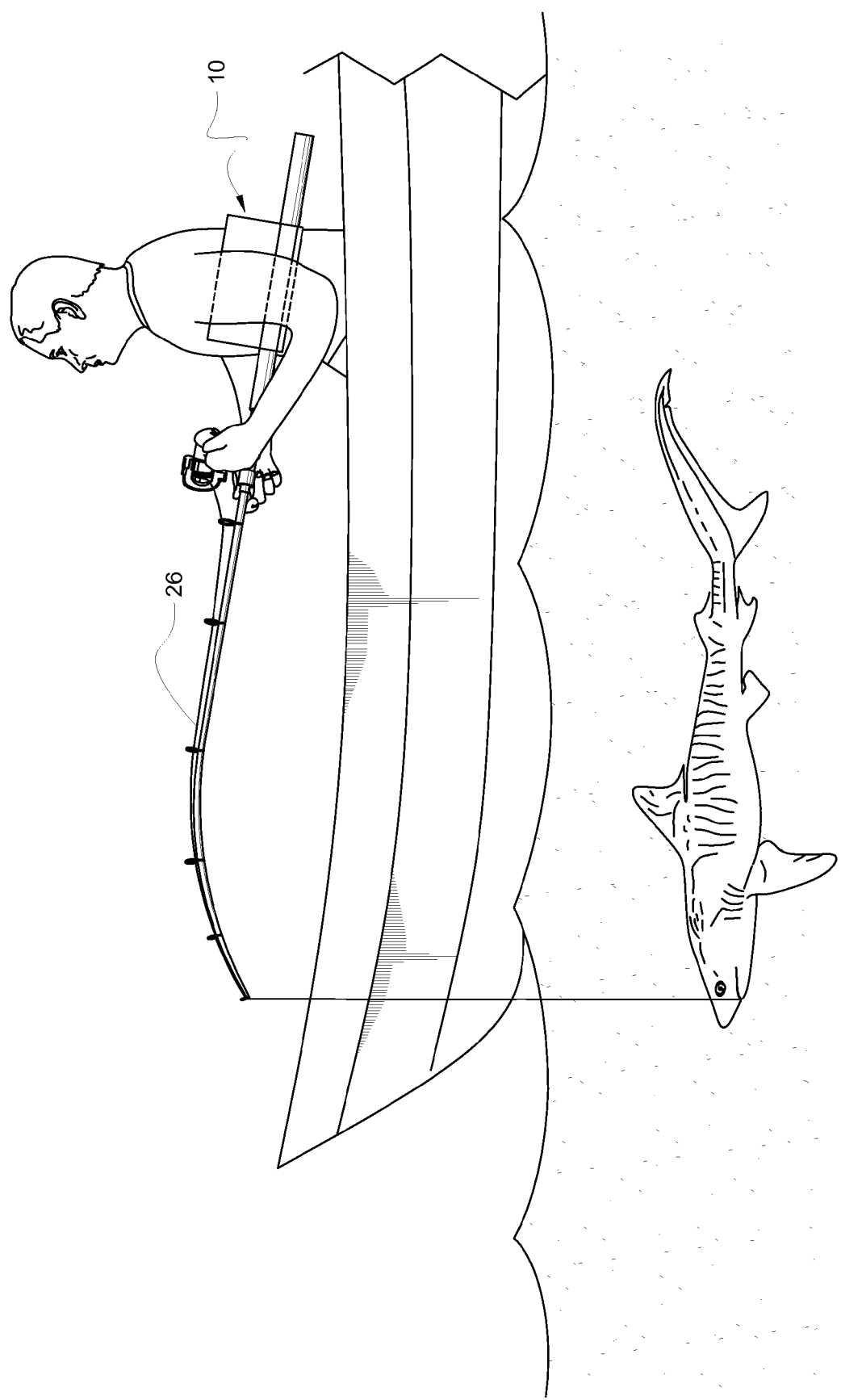
FIG. 3 is a perspective view depicting the novel cushion in use.

FIG. 3 depicts the novel cushion in use. It is positioned under the arm of a fisherman, with the top wall 16 abutting the underarm area of the user.

The ergonomic shape of cushion 10 or 10a fits the contour of the user's underarm so that the cushion may be used for long periods of time with complete comfort. The above-mentioned cylindrical cushion, in contrast, does not fit said contour and therefore restricts blood flow in the underarm area, greatly shortening the length of time it may be used. The user's arm may grow numb from lack of blood supply if said cylindrical cushion is used for the duration of a fight with a large fish.

Figure 4:
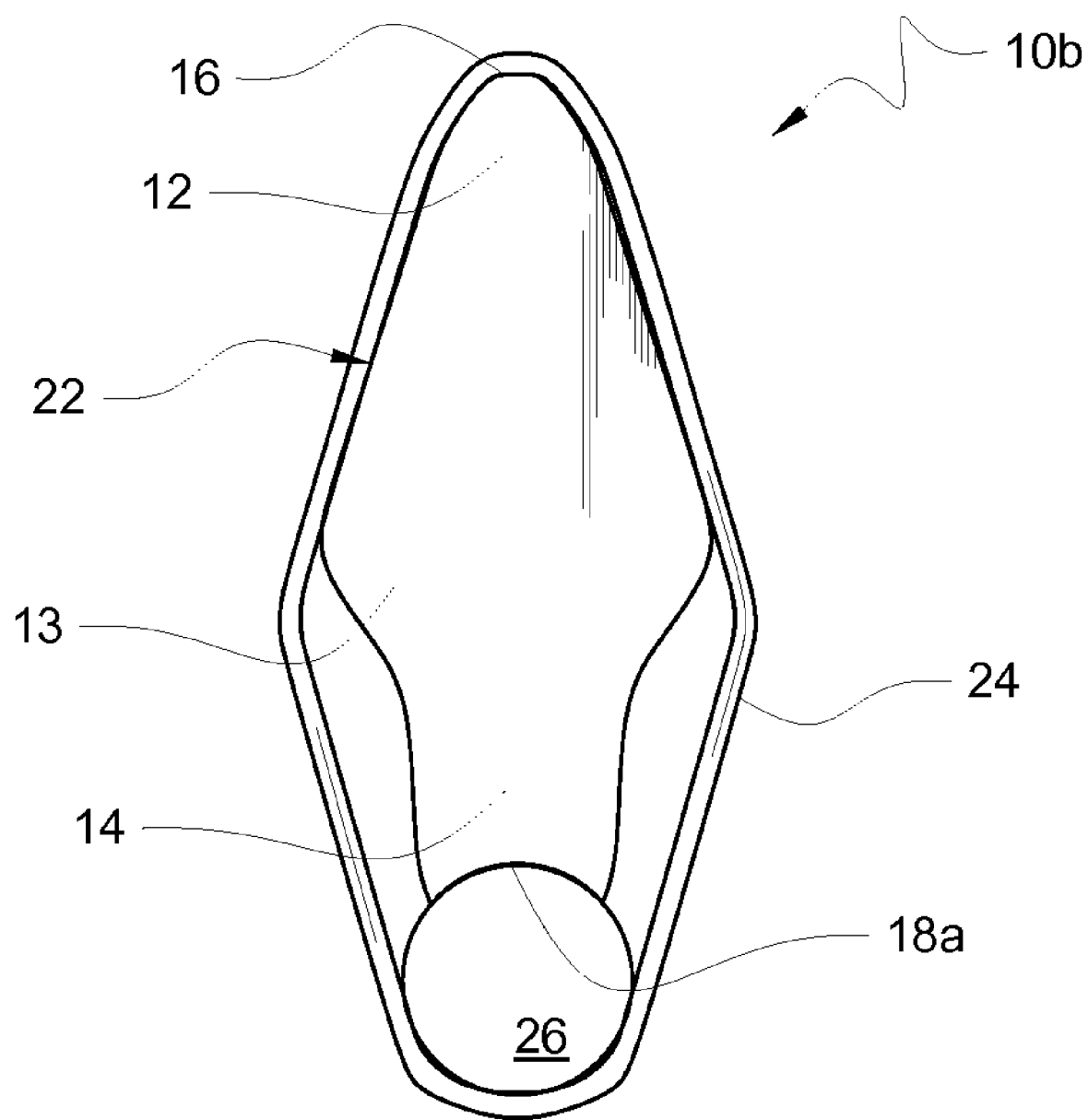
FIG. 4 is an end view of a third embodiment.

A third embodiment 10b is depicted in FIG. 4. This embodiment is provided in two parts. The first part is denoted 22 and has the same ergonomic shape as cushions 10 and 10a of the first and second embodiments, respectively, with the difference being that no bore 20 is formed therein and that bottom wall 18a forms a concavity to receive the proximal end of a fishing rod. Thus, first part 22 is a solid cushion. The second part is denoted 24 and is adapted to ensleeve first part 22 as well as the proximal end of a fishing rod 26. Second part 24 is formed of an elastic material so that it tightly secures first part 22 to said proximal end. The elastic material tightly wraps around first part 22 when the cushion is not attached to a fishing rod. When it is desired to attach said cushion to the proximal end of a rod, elastic material 24 is pulled outwardly away from the cushion and the proximal end of the rod is pushed into the opening between said material and said cushion. The result is a tight fit of the elastic material around the proximal end, thereby tightly securing the cushion to said proximal end.

The third embodiment has the advantage of dedicating all of the cushioning material to the job of cushioning the user's underarm area from the violent upward movements of the proximal end of the fishing rod.

All embodiments of the novel cushioning device enable the butt, i.e., proximal end of the fishing rod to be placed into a rod holder without removing the novel cushioning device. This alone represents a substantial advantage over the cushioning devices heretofore known.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. An ergonomic cushion system adapted to be releasably attached to a proximal end of a fishing rod, comprising:

a solid cushion having a top rounded end which fits comfortably in the under arm area of a user, a bottom end, and an intermediate portion therebetween, said top end and said bottom end defining a longitudinal axis and a height of said cushion therebetween, said bottom end having a concave surface facing downwardly away from said top rounded end which conforms to a contour of the fishing rod, said intermediate portion having a width which is a maximum width of said cushion, said cushion constantly tapering upwardly from said intermediate portion toward said top rounded end which has a width which is a minimum width of said cushion, said cushion gradually tapering downwardly from said intermediate portion toward said bottom end which has a width greater than the width of said top rounded end and less than the width of said intermediate portion, said height of said cushion being greater than said maximum width of said cushion, said cushion being formed of a foam that conforms to a shape of a user's under arm area;

an elastic band adapted to tightly ensleeve said cushion and the proximal end of the fishing rod, said elastic band having a length substantially equal to said height of said cushion, said elastic band circumscribing an entire perimeter of said cushion;

all of said cushion being adapted to be positioned between an underarm of a user and the proximal end of said fishing rod;

whereby said cushion is attached to the proximal end of the fishing rod by pulling the elastic band outwardly away from the cushion and by pushing the proximal end of the rod into an opening created by the outwardly pulling, the opening being between said elastic band and said bottom of said cushion;

whereby a tight fit is achieved between the elastic band around the proximal end of the fishing rod and said cushion, thereby tightly securing the cushion to the proximal end of the fishing rod.

* * * * *